Sept. 16, 1930. H. J. MURPHY 1,775,688
LUBRICATING SYSTEM
Filed Aug. 25, 1925
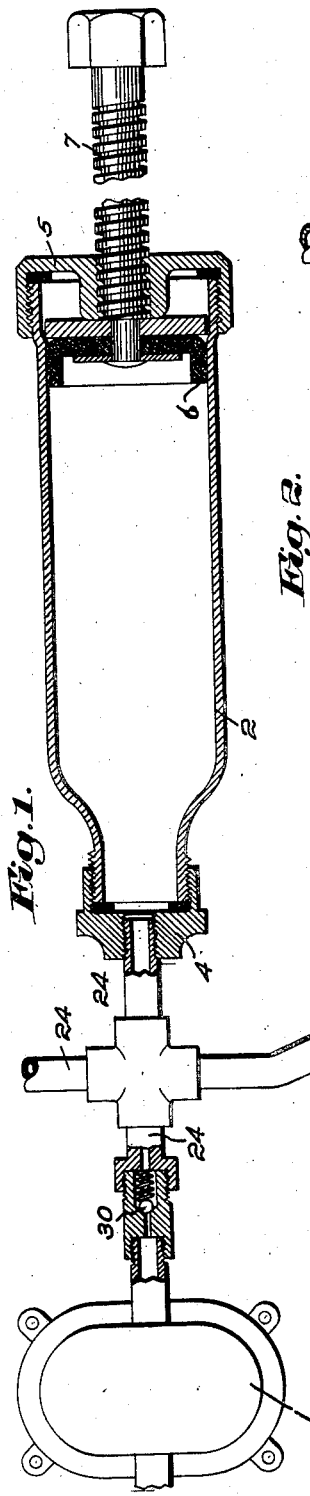
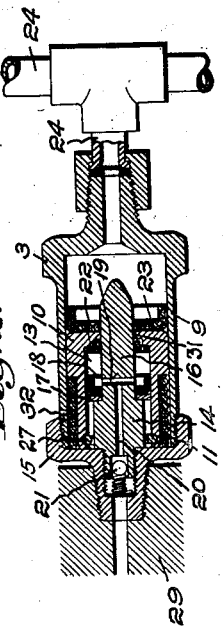
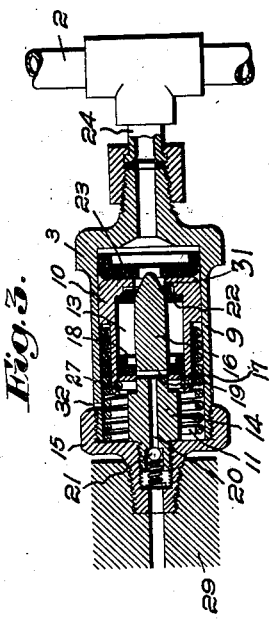
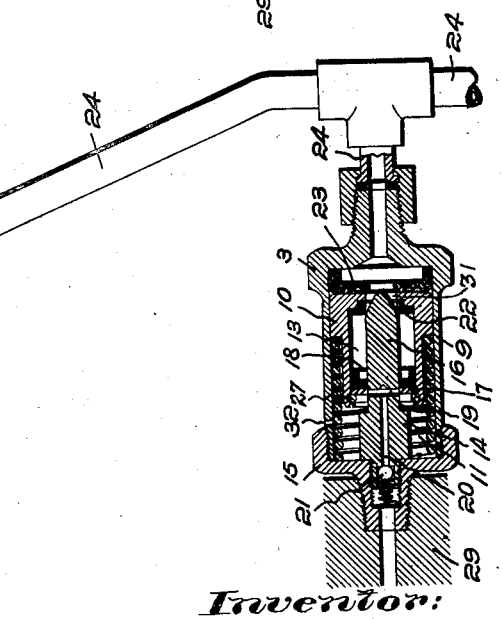
Inventor:
Howard J. Murphy.
by Emery Booth Janney & Varney
Atty.

Patented Sept. 16, 1930

1,775,688

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed August 25, 1925. Serial No. 52,405.

This invention aims to provide an improved lubricating system.

In the drawings which illustrate a preferred embodiment of my invention:

Fig. 1 is a view of the system showing parts thereof in elevation and parts in cross section;

Fig. 2 is a section through one of the pressure multiplying and lubricant discharging devices located at one of the bearings and showing the lubricant being discharged therefrom; and Fig. 3 is a section of the device illustrated in Fig. 2 showing the relation of parts of the device immediately subsequent to closing the passage between the low pressure and high pressure chambers.

Referring to the drawings I have shown a lubricating system which is particularly, though not exclusively, useful for lubricating a plurality of bearings of an automobile at one time by exerting pressure on the lubricant at one centrally located point.

The system, as illustrated in Fig. 1, includes a pump 1 for supplying lubricant under low pressure, an auxiliary supply tank or barrel 2 and a plurality of measuring and pressure multiplying devices 3 (only one being shown in the drawings).

The pump 1 may be of any suitable construction and may pump lubricant to the devices 3 from any source of lubricant supply. When used in connection with an automobile the lubricant may be pumped from the crank case of the engine.

The auxiliary barrel 2 includes a front head 4, a back head 5 and is provided with a lubricant expelling plunger 6 carried at one end of a stem 7 threaded into the back head 5. At the outer end I have provided a nut 8 to which may be secured a lug wrench or other suitable tool for moving the plunger in the barrel as more fully hereinafter described.

Each lubricant measuring and pressure multiplying device or cup 3 is provided with a hollow cylinder portion 9 containing a piston 10 normally urged toward the inlet end of the cylinder by a spring 11 as shown in Fig. 1. The piston 10 is also hollow to provide a chamber 13 into which projects a valve part 14 carried by the removable head 15 at the outlet end of the cylinder 9. The valve part has a reduced portion 16 around which is fitted a metal washer 17 and a cup washer 18 for closing the outlet end of the chamber 13, and for preventing flow of lubricant through the ports 19 located in the valve part 14 beyond the metal washer 17. The outlet passage 20 of the device is normally closed by a spring pressed valve 21. At the inlet end of the chamber 13 I have provided a flexible hat washer 22 for preventing flow of lubricant from the cylinder 9 to the chamber 13 during expulsion of lubricant from the chamber 13. A relatively large cup washer 23 is provided in the cylinder 9 at the end of the piston 10 to prevent leakage of lubricant around the piston.

All of the parts that make up the system, namely the pump 1, the auxiliary barrel 2 and the lubricant measuring and pressure multiplying devices, are connected with one another by conduits or easily bendable tubing 24 as shown in Fig 1.

In operation, the pump 1 forces lubricant under a relatively low pressure past a spring pressed ball check 30 through the conduits 24 to the chambers 13 in the pressure multiplying charge determining devices. Normally the plunger 6 in the tank 2 is at the outer end of the tank so that the tank may also be filled by the pump 1. Thus the entire system is normally kept filled with lubricant by the pump 1. The spring 11 normally urges the piston 10 toward the inlet end of the cylinder 9 so that the lubricant may flow freely from the cylinder through the aperture 31, connecting the chamber 13 with the cylinder, and past the end of the valve part 16 as illustrated in Fig. 1. The pressure of the lubricant will force the packing or cup leather 18 and washer 17, which back supports the washer 18, against the spring ring 27 without uncovering the passage 19, as illustrated in Fig. 1, thereby preventing flow of lubricant past the chambers 13.

If now it is desirable to force lubricant to the bearings 29, the operator simply places a suitable wrench over the nut 8 and turns the tool in a clockwise direction to force the plunger 6 toward the outlet end of the tank 2. This action will cause the pressure of the lubricant to build up sufficiently to operate the pistons 10 in the lubricant devices 3 as the lubricant cannot escape. The ball check 30 prevents the lubricant from escaping through the pump 1. As the pressure in the system builds up sufficiently to overcome the pressure exerted upon each piston by the spring 11, the pistons 10 will be forced toward the outlet ends of the cylinders. During this operation the pistons first move toward the valve parts 14 and the tapered ends thereof enter the apertures 31 to cut off the supply of lubricant to the chambers 13. The hat washers 22 fit closely around the reduced ends 16 and are pressed tightly thereagainst by the lubricant to provide a seal, as best illustrated in Fig. 3. Next the ports 19 are uncovered by the packing 18 which thereafter abuts against the annular shoulder formed on the valve part 14. As the piston moves further the lubricant in the chamber 13 will be forced through the ports 19 past the ball check 21 into the bearing 29. At the end of the stroke, the piston abuts against the removable head 15 of the device as illustrated in Fig. 2.

After the lubricant has been forced from each device to the bearings as will be indicated when it is impossible to move the piston 6 further in the tank 2, the operator must turn the nut 8 in a contra-clockwise direction until the piston 6 is returned to the outer end of the tank 2. The pressure in the system will be released as the piston 6 returns and the springs 11 in the pressure devices 3 will return the pistons 10 to their normal positions so that the system may again be filled by the pump 1.

During the return stroke of the piston 10 the lubricant is prevented from being drawn back into the chamber 13 by the check valve 21 located in the outlet passage 20.

It will be understood from the above description that each pressure multiplying and charge determining device will operate independently of the rest. If any one or number of the bearings become clogged, the devices at their bearings will operate independently of each other and the rest of the device to build up pressure enough to force the dirt or hardened lubricant from the bearing or bearings and deliver a fresh supply of lubricant thereto.

The cross-sectional area of the chamber 13 is substantially smaller than the cross-sectional area of the cylinder 9 and therefore a relatively greater pressure can be built up in the chamber 13 than the pressure required to move the piston 9. The proportionate areas of the two can be determined by experimentation so as to provide for opening any bearing which may become clogged under ordinary conditions.

If lubricant leaks by the washer 18 into the chamber where the spring 11 is located it may leak out through a vent 32 provided in the wall of the devices so as not to interfere with the operation of the piston 10.

While I have shown and described a preferred embodiment of my invention it will be understood that changes involving omission, substitution, alteration and reversal of parts and even changes in the mode of operation may be made without departing from the scope of my invention which is best defined in the appended claims.

Claims:

1. A lubricating system including a plurality of pressure multiplying lubricant delivering devices, means for supplying lubricant under relatively low pressure to said devices, manually operated means for supplying lubricant to said devices at an increase of pressure over that supplied by said first mentioned means thereby to operate pressure multiplying means within said devices to expel lubricant therefrom at a pressure substantially greater than the pressure of the lubricant entering said devices.

2. A lubricating system including a plurality of pressure multiplying lubricant measuring devices, means for supplying lubricant under relatively low pressure to said devices, screw operated means for supplying lubricant to said devices at an increase of pressure over that supplied by said first mentioned means thereby to operate pressure multiplying means within said devices to expel a predetermined quantity of lubricant therefrom at a pressure substantially greater than the pressure of the lubricant entering said devices.

3. In a lubricating system of the class described, a lubricant supply tank, a conduit system connecting said tank with a plurality of bearings to be lubricated, said conduit system being gas-tight and sealed against the entry of gas thereinto, pressure multiplying, lubricant discharging devices adjacent the bearings, manually operated means for forcing lubricant from said tank to said devices, and means located in said devices and operable by the lubricant forced thereto to expel lubricant therefrom at a greatly increased pressure.

4. A lubricating system of the class described comprising a source of lubricant, a pressure multiplying and charge determining device adjacent a bearing to be lubricated, a gas-tight conduit system connecting said device with said source, the lubricant at said source serving as a gas seal for the inlet to said conduit system, pump means for supplying lubricant to said device, a manually operated compressor for increasing the pressure of the lubricant so supplied and a reciprocable member operable relative to a stationary member in said device for forcing a predetermined charge of lubricant from said device to a bearing at a relatively increased pressure over the pressure of the lubricant forced to said device.

5. A lubricating system comprising, in combination, a pressure multiplying device having a cylinder part, a piston reciprocable in said cylinder, a chamber of relatively smaller cross-sectional area than the cross-sectional area of said cylinder, a passage between said cylinder and said chamber normally open, a source of lubricant for supplying lubricant under relatively low pressure to said chamber and manually operated means for supplying lubricant under a relatively high pressure to said chamber thereby to move said piston to close the passage between said chamber and said cylinder and then to force lubricant from said device at a greatly increased pressure over that supplied to said cylinder.

6. A lubricating system comprising, in combination, a lubricant measuring and pressure multiplying device located adjacent to a bearing, means for supplying lubricant to said device at a relatively low potential pressure to fill said device, valve means for preventing flow of lubricant from said device to said bearing under low pressure, an auxiliary supply barrel and lubricant expelling means in said barrel for forcing lubricant from said barrel at a relatively higher pressure than supplied by said first mentioned means thereby to operate a piston in said device to force the lubricant in said device to said bearing under a pressure which is relatively higher than said second mentioned pressure.

7. A lubricating system comprising, in combination, a lubricant measuring and pressure multiplying device located adjacent to a bearing, means for supplying lubricant to said device at a relatively low potential pressure to fill said device, stationary valve means for preventing flow of lubricant from said device to said bearing under low pressure, an auxiliary supply barrel and lubricant expelling means in said barrel for forcing lubricant from said barrel at a relatively higher pressure than supplied by said first mentioned means thereby to operate a piston in said device relative to said stationary valve means thereby to force the lubricant in said device to said bearing under a pressure which is relatively higher than said second mentioned pressure.

8. A charge determining pressure multiplying lubricating device comprising, in combination, a cylinder having a spring pressed piston part normally urged toward the inlet end thereof, a chamber of relatively smaller cross-sectional area than said cylinder located in said piston part, and a fixed valve part extending into said chamber to provide valve means for closing an inlet passage leading into said chamber and for providing an outlet for lubricant trapped in said chamber, said valve means operable by reciprocation of said piston part in said cylinder.

9. A charge determining pressure multiplying lubricating device comprising, in combination, a cylinder having a spring pressed piston part normally urged toward the inlet end thereof, a chamber of relatively smaller cross-sectional area than said cylinder located in said piston part, a fixed valve part extending into said chamber to provide valve means for closing an inlet passage leading into said chamber and for providing an outlet for lubricant trapped in said chamber, said valve part operable by reciprocation of said piston part in said cylinder, and a check valve located in the outlet from said valve part to prevent return of lubricant to said chamber during the return stroke of said piston part.

10. A charge determining pressure multiplying lubricating device comprising, in combination, a cylinder having a spring pressed piston part normally urged toward the inlet end thereof, a flexible cup washer located in said cylinder at the end of said piston, a chamber presented by said piston part having a relatively smaller cross-sectional area than the cross-sectional area of said cylinder, a fixed valve part projecting into said chamber, a hat washer for engagement with said valve part to provide a seal between the cylinder and the chamber at the inlet end of said chamber and a flexible sealing washer slidable relative to said sealing part in said chamber to close and open a passage through which the lubricant from said chamber is discharged and a check valve at the outlet end of said device for preventing return of lubricant after passing said check valve.

11. A charge determining pressure multiplying device comprising, in combination, a cylinder, a fixed valve part located within said cylinder, a piston reciprocable in said cylinder relative to said valve part, a chamber within said piston and sealing means in said chamber surrounding said valve part, said piston and said sealing means movable in said cylinder to close the inlet into said chamber and open an outlet from said chamber and said piston continuing to move relative to said valve part to force the lubricant from said chamber at a relatively high potential pressure.

12. A charge determining pressure multiplying device including a cylinder, a piston reciprocable in said cylinder, a charge determining chamber in said piston of relatively smaller cross-sectional area than the cross-sectional area of said cylinder, a fixed valve part extending into said chamber for closing the inlet to said chamber, and a packing surrounding said valve part, said packing movable with said piston to open a passage in said valve part leading to the discharge passage of said device and said piston movable relative to said packing after said passage has been opened thereby to force the lubricant from said chamber under a relatively high potential pressure.

13. A charge determining pressure multiplying device including a cylinder, a piston reciprocable in said cylinder, a charge determining chamber in said piston of relatively smaller cross-sectional area than the cross-sectional area of said cylinder, a fixed valve part extending into said chamber for closing the inlet to said chamber, a packing surrounding said valve part, said packing movable with said piston to open a passage in said valve part leading to the discharge passage of said device and said piston movable relative to said packing after said passage has been opened thereby to force the lubricant from said chamber under a relatively high potential pressure, and a valve in the discharge passage to prevent return of lubricant to said chamber during the return stroke of said piston.

14. A lubricating system comprising, in combination, a source of lubricant under pressure, conduits leading therefrom to a plurality of bearings to be lubricated, a metering device adjacent each bearing, said metering devices being constantly in communication with said source of lubricant under pressure, the pressure exerted by said source being incapable of operating said device and manual means adjacent said source of lubricant under pressure to increase the pressure on the lubricant in said conduits and thereby actuate said metering devices.

15. A lubricating system comprising, in combination, a source of lubricant under pressure, conduits connecting said source with a plurality of bearings, a metering device adjacent each bearing, manual means to increase pressure on the lubricant in said conduit to actuate said metering devices, and means associated with said metering devices to further increase the pressure on the lubricant therein.

In testimony whereof, I have signed my name to this specification.

HOWARD J. MURPHY.